United States Patent
McKenzie et al.

[11] Patent Number: 6,127,630
[45] Date of Patent: Oct. 3, 2000

[54] RECESSIBLE ELECTRICAL RECEPTABLE

[76] Inventors: James P. McKenzie, 982 Pebblestone Rd., Pasadena, Md. 21122; Mark D. Kuhn, 1837 Trenleigh La., Baltimore, Md. 21234

[21] Appl. No.: 08/505,120

[22] Filed: Jul. 21, 1995

[51] Int. Cl.[7] .................................................. H01H 9/02
[52] U.S. Cl. ........................... 174/58; 174/66; 220/241; 248/906
[58] Field of Search ................... 174/48, 50, 53, 174/58, 66, 67, 57; 220/241, 242, 3.8, 3.92, 3.94, 3.3, 3.2; 248/906, 202.1

[56] References Cited

U.S. PATENT DOCUMENTS

| | | | |
|---|---|---|---|
| 864,930 | 9/1907 | Siegfried | 174/17 CT |
| 1,545,639 | 7/1925 | Cohen . | |
| 1,713,101 | 5/1929 | Starrett | 174/66 |
| 2,811,574 | 10/1957 | Guerrero . | |
| 2,811,575 | 10/1957 | Guerrero . | |
| 3,140,344 | 7/1964 | Slater | 174/67 |
| 3,204,807 | 9/1965 | Ramsing | 220/24.3 |
| 3,433,886 | 3/1969 | Myers . | |
| 3,622,684 | 11/1971 | Press . | |
| 3,662,085 | 5/1972 | Robinson et al. | 174/48 |
| 3,684,819 | 8/1972 | Wilson | 174/53 |
| 3,794,956 | 2/1974 | Dubreuil . | |
| 4,109,095 | 8/1978 | Kling et al. | 174/67 |
| 4,984,982 | 1/1991 | Brownlie et al. | 439/131 |
| 5,117,122 | 5/1992 | Hogarth et al. | 307/140 |
| 5,117,996 | 6/1992 | McShane | 220/3.7 |

FOREIGN PATENT DOCUMENTS

| | | | |
|---|---|---|---|
| 673191 | 10/1963 | Canada | 174/53 |

*Primary Examiner*—Kristine Kincaid
*Assistant Examiner*—Dhiru R Patel
*Attorney, Agent, or Firm*—Rosenberg, Klein & Lee

[57] ABSTRACT

A recessible electrical receptacle including an open-ended housing mounted in a building member with a hinged closure pivotable from a service position to a recessed position flush with the building member. Sealing is disposed between the housing and closure for deterring introduction of fluid in the housing. A conventional duplex receptacle is mounted on the closure. Electrical conduits provide electrical communication between the receptacle and electrical contacts on the housing. A latch mounted on the housing may be selectively engaged with the housing to maintain the closure in the recessed position.

15 Claims, 4 Drawing Sheets

RECESSIBLE ELECTRICAL RECEPTABLE

BACKGROUND OF THE INVENTION

1. Field of the Invention

This invention relates to electrical receptacles. More particularly, the present invention relates to recessible, deenergizable electrical receptacles.

2. Description of the Prior Art

Electricity is fascinating yet dangerous, especially to youths with naive, unchecked curiosity. The trials and errors of maturation beget wisdom. However, electricity does not always let the unwitting slip serve as a lesson. The mercurial, unpredictable nature of electricity coupled with popular naivete makes electrical safety paramount. A need exists for a foolproof device which provides electrical power to homes and work places, yet safeguards energy users from potentially lethal direct electrical contact.

Several types of recessible electrical receptacles are described in the patent literature. Unfortunately, the apparatuses described only provide for telescoping or rotating recessibility.

For example, U.S. Pat. No. 1,545,639, issued Jul. 14, 1925, to Samuel Cohen, describes a vacuum tube mounting. The apparatus includes a base. The base has a face on which is mounted a socket for receiving a vacuum tube. Rods extend from the face beyond the vacuum tube. Sleeves are radially diverged about an aperture in a building wall member. The sleeves slidingly receive the rods. As the rods slide telescopingly through the sleeves, the vacuum tube passes through the aperture and is exposed in the room. U.S. Pat. No. 2,811,574, issued Oct. 29, 1957, to John J. Guerrero, U.S. Pat. No. 2,811,575, issued Oct. 29, 1957, to John J. Guerrero, U.S. Pat. No. 3,433,886, issued Mar. 18, 1969, to John L. Myers, and U.S. Pat. No. 3,794,956, issued Feb. 26, 1974, to Real R. Dubreuil, each describe an adjustable electric receptacle. The devices each include an open-ended housing mounted in a building member. Each housing telescopingly receives a receptacle assembly. A closure plate is mounted on top of each receptacle assembly. When the receptacle assembly is articulated from a service position to a recessed position within the housing, the closure plate is generally flush with the building member outer surface. The patents to Guerrero, Myers and Dubreuil also include seals disposed about the receptacle assembly and housing to prevent introduction of fluid when in the recessed position.

U.S. Pat. No. 3,622,684, issued Nov. 23, 1971, to Paul R. Press, describes a rotatable floor receptacle mounting unit. The apparatus includes an open-ended housing mounted in a building member. A receptacle assembly is rotatably mounted at the mouth of the housing. The receptacle assembly pivots about an axis transverse to the central axis of the housing. A seal is interposed between the housing and receptacle assembly.

Clearly, the above demonstrates a need for a recessible electrical receptacle including a hinged means for recessing an electrical receptacle.

None of the above references, taken alone or in combination, are seen as teaching or suggesting the presently claimed recessible electrical receptacle.

SUMMARY OF THE INVENTION

The present invention overcomes the above limitations of the above inventions by providing a recessible electrical receptacle which is hingedly recessible. The invention includes an open-ended housing mounted in a building member. A closure having an outer and an inner surface is pivotally mounted on the housing. The closure is pivotable from a recessed position to a service position. The closure may be biased toward the service position. In the recessed position, the closure is flush with the building member outer surface. Sealing means are disposed between the housing and closure for deterring introduction of fluid in the housing. A conventional duplex receptacle having two electrical sockets is mounted on the inner surface of the closure. Splash guards are mounted on the closure and permit the user to cover a socket. Electrical conduits provide electrical communication between the receptacle and electrical contacts on the housing. A latch, slidable from a locked position, toward which it is biased, to a retracted position, is mounted on the closure. In the extended position, when the closure is in the recessed position, the latch engages the housing.

In consideration of the above, an object of the invention is to provide a recessible electrical receptacle that hingedly articulates from a service position to a recessed position flush with a building surface.

Another object of the invention is to provide a recessible electrical receptacle having sealing means to discourage introduction of fluid therein.

A further object of the invention is to provide a recessible electrical receptacle that is biased toward a service position.

An additional object of the invention is to provide a recessible electrical receptacle having a latch that is biased toward a locked position for maintaining the receptacle in a recessed position.

Yet another object of the invention is to provide a recessible electrical receptacle with splash guards for selectably covering the electrical sockets therein.

Yet a further object of the invention is to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features of the invention consistently throughout the attached drawings.

DETAILED DESCRIPTION OF THE PREFERRED EMBODIMENT

Figure 1:
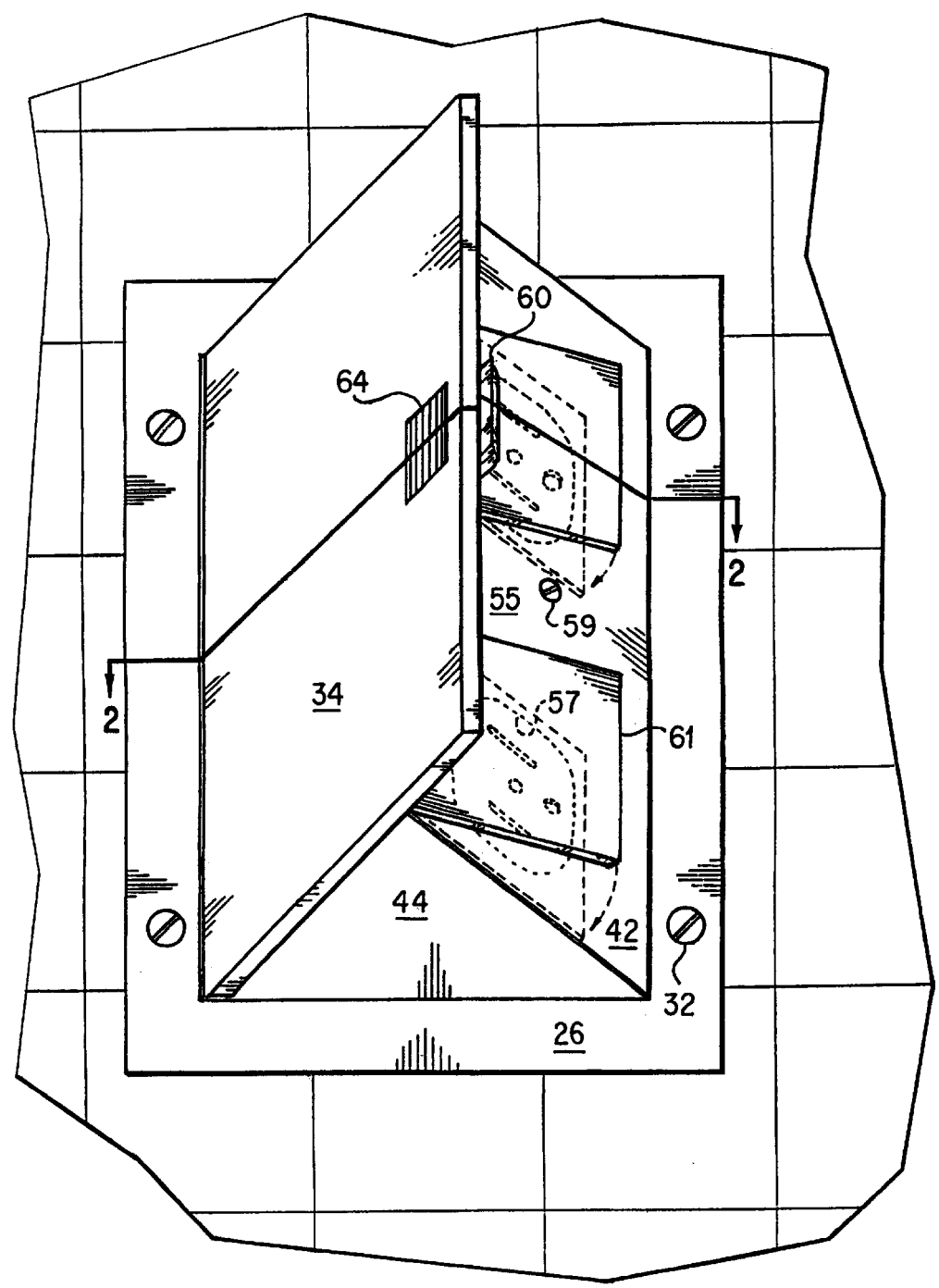
FIG. 1 is an environmental perspective view of the invention installed in a building, the invention being shown articulated to the service position.
Figure 3:
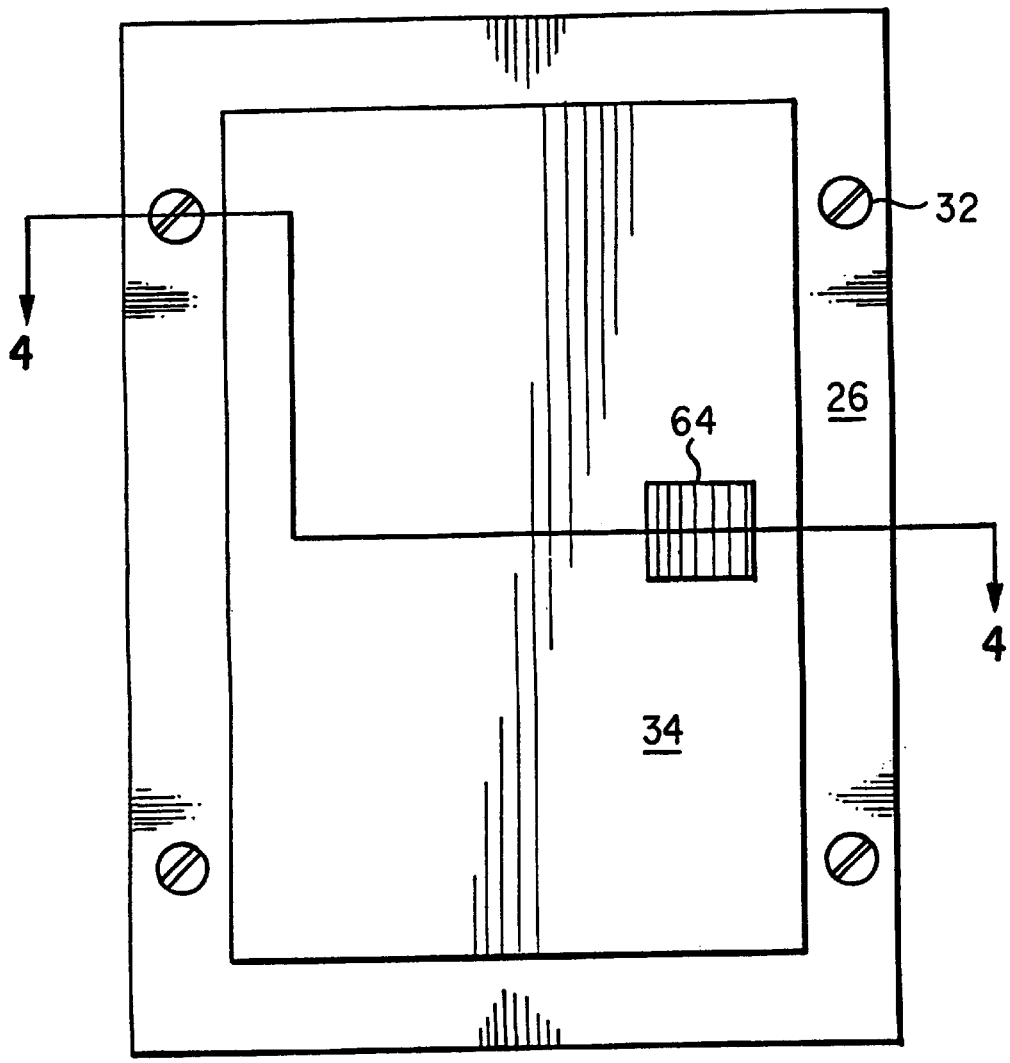
FIG. 3 is a top plan view of the invention articulated to the recessed position.

Referring to FIGS. 1 and 3, the invention is shown installed in a conventional kitchen counter top. The apparatus is articulated from an open, service position, as shown in FIG. 1, to a closed, recessed position, as shown in FIG. 3.

Figure 2:
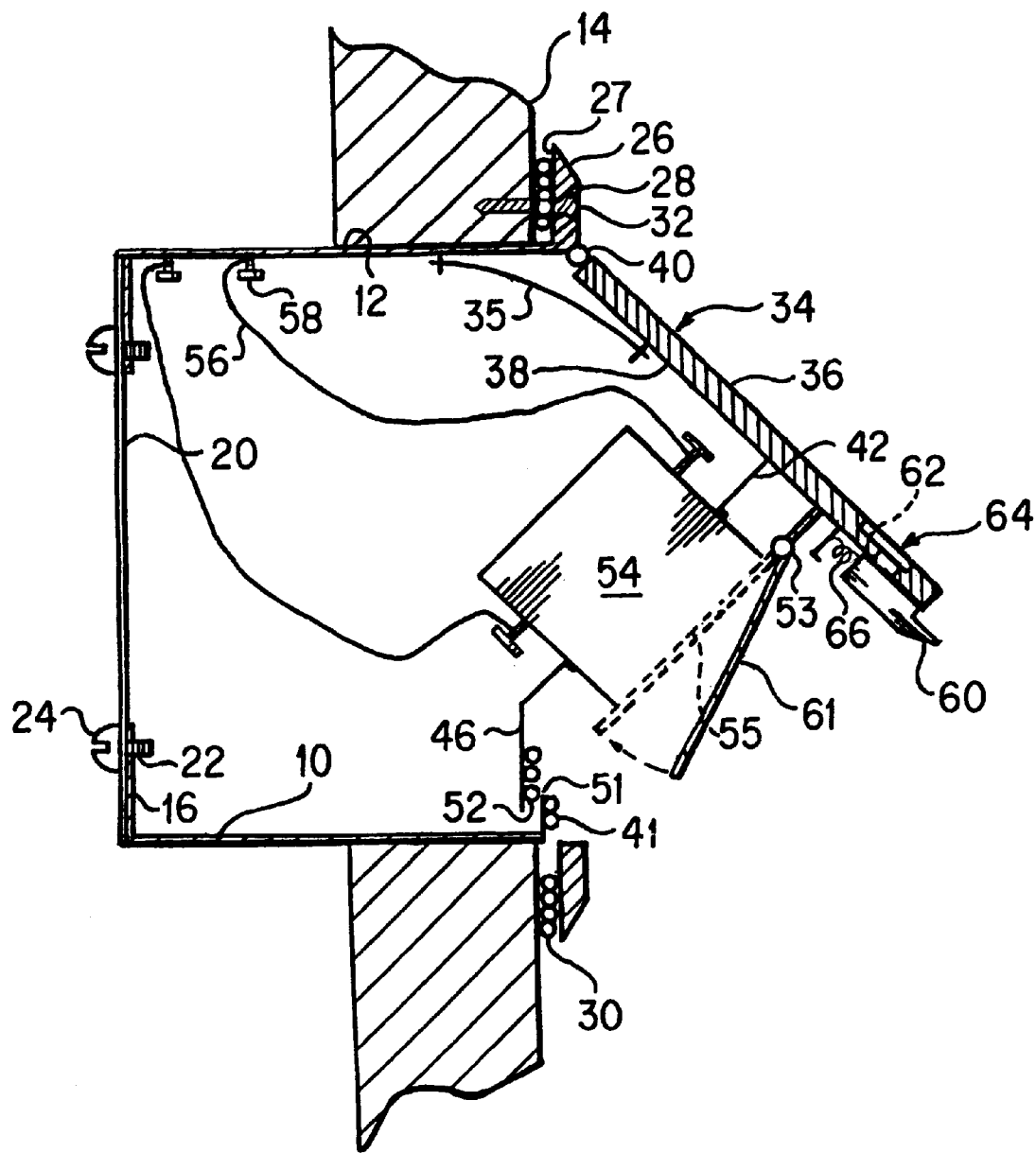
FIG. 2 is cross-sectional detail view of the invention taken along line 2—2 in FIG. 1.
Figure 4:
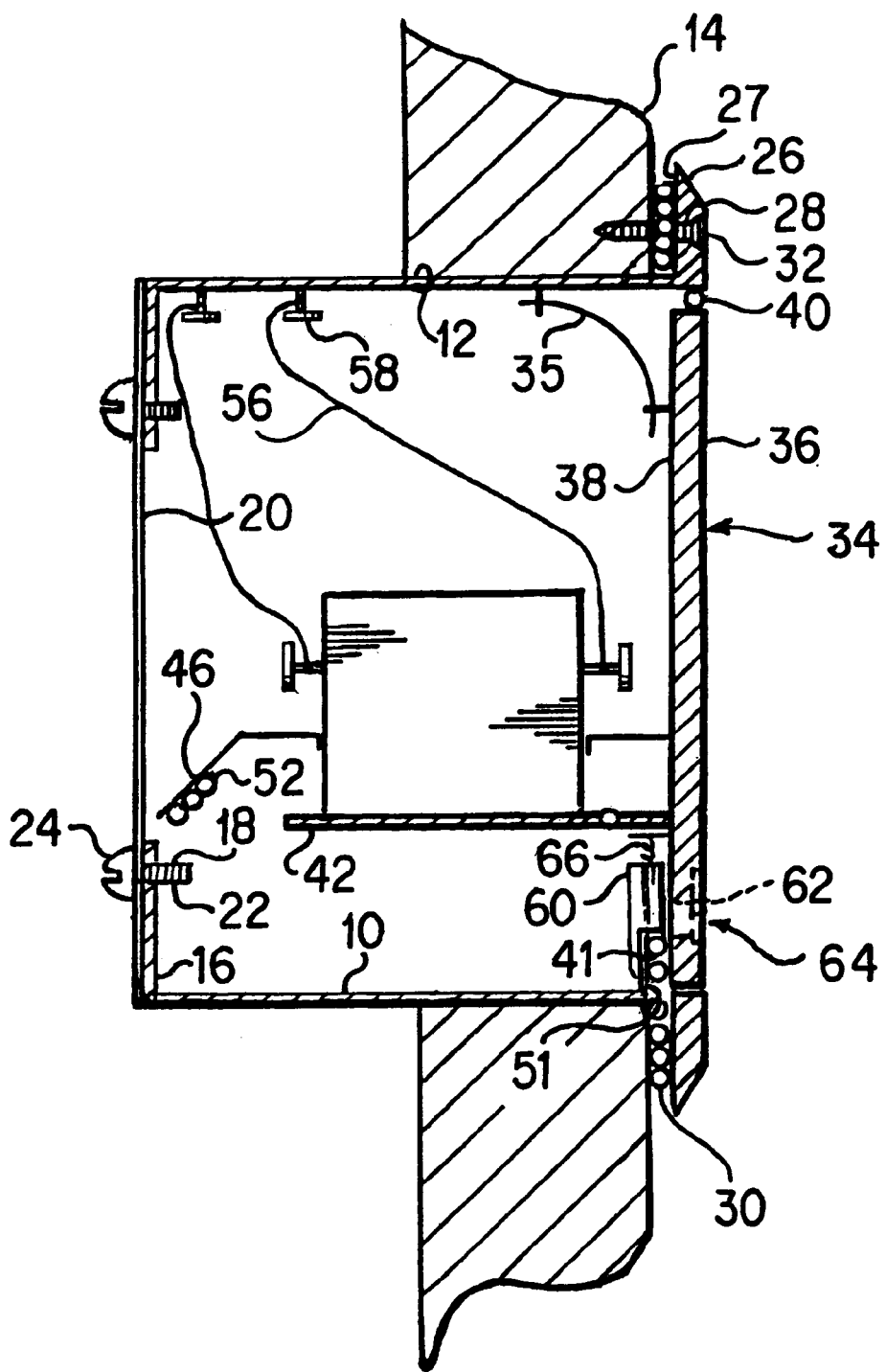
FIG. 4 is cross-sectional detail view of the invention taken along line 3—3 in FIG. 3.

With reference now to FIGS. 2 and 4, the invention includes an open-ended housing 10 received in an aperture 12 in a building member, e.g., a counter, 14. The housing 10 includes back flanges 16 each having a plurality of threaded bores 18. A detachable back cover 20, having a plurality of throughbores 22 in registration with the threaded bores 18, sealingly mounts on the back end of the housing 10 with threaded fasteners 24.

The housing 10 also includes an integral, border face plate 26 having an inner surface 27 and a plurality of throughbores 28, as best seen in FIGS. 1 and 3. A first seal 30 is interposed between the face plate 26 and the building member 14. Threaded fasteners 32 are received in the throughbores 28 and threadingly engage the building member 14. The first seal 30 deters fluid from leaking into the housing 10. Since the invention is purposed at installation on a counter top, a notoriously wet area, sealing is crucial to proper and reliable functioning of the invention.

The invention provides a closure 34 having an outer surface 36 and an inner surface 38. The closure 34 is pivotally mounted on the housing 10 by a hinge 40. The hinge 40 is shown constructed from precisely machined parts, tightly fitted for deterring fluid seepage. The hinge components may be coated with a polytetrafluoroethylene compound such as "Teflon®" (not shown) or other water-resistant material to deter fluid from entering the housing 10 through the hinge 40. Alternatively, the hinge 40 could be a living hinge, constructed from an elongated, flexible, waterproof strip (not shown), one side attached to the face plate 26, the other attached to the closure 34.

The closure 34 is pivotable about the hinge 40 from a service position, as shown in FIG. 1, to a recessed position, as shown in FIG. 4. In the recessed position, the closure 34 is flush with the face plate 26 and generally flush with the building wall 14. The closure 34 is biased toward the service position with a spring 35.

The housing 10 includes a seal 41 peripherally disposed on its outer periphery. The seal 41 deters introduction of fluid into the housing when the closure 34 is articulated to a recessed position.

A longitudinal wall 42 extends generally perpendicularly from the inner surface 38 of the closure 34. Two transverse walls 44 are wedged between the distal edge 46 of the longitudinal wall 42 and the closure 34. The closure 34, longitudinal wall 42 and transverse walls 44 define an open volume.

A first flange 46 peripherally extends outwardly from the distal edges of the longitudinal wall 42 and transverse walls 44, respectively. When the closure 34 is articulated to the service position, the first flange 46 mates with a second flange 51 that extends inwardly from the housing 10. A seal 52 is interposed between the first flange 46 and second flange 51 for deterring introduction of fluid into the housing 10.

A conventional duplex receptacle 54 is sealingly mounted on the longitudinal wall 42. The receptacle 54 has a face plate 55 having apertures for receiving two electrical sockets 57; any number of sockets 57 may be disposed on the face plate 55. The receptacle 54 is secured to the longitudinal wall 42 by a threaded fastener 59. Electrical conduits 56 provide electrical communication between the receptacle 54 and electrical contacts 58 on the housing 10.

Splash guards 61 are shown mounted on the closure 34 proximate a socket 57. The splash guards 61 also may be mounted on the face plate 55 of the receptacle 54. Each splash guard 61 is shown having a conventional, piano-type hinge 53. The hinge may be of the living hinge-type, or any construction suited for the purposes of the invention. The splash guard 61 may be articulated to a closed position, shown in dashed lines on FIGS. 1 and 2, in contact with its respective socket 57. When the splash guard 61 is in the closed position, it deters fluid from entry into the socket 57 and possibly short circuiting it. The splash guard 61 is articulated to an open position to permit insertion of a power cord into the socket 57.

A latch 60 is slidingly received in a slot 62 in the closure 34. A slide bar 64 disposed on the outer surface 36 of the closure 34 is connected to the latch 60. The latch 60 may be articulated with the slide bar 64 from an extended position, as shown, to a retracted position. The latch 60 is biased toward the extended position with a spring 66. In the extended position, when the closure 34 is in the recessed position, the latch 60 engages with the second flange 51.

The present invention is not intended to be limited to the sole embodiment described above, but to encompass any and all embodiments within the scope of the following claims.

We claim:

1. A recessible electrical receptacle apparatus comprising: a housing; a closure having an inner surface and an outer surface; hinge means for pivotally mounting said closure on said housing, said closure being pivotable from a closed, recessed position to an open, service position; an electrical receptacle including at least one socket; at least one splash guard for each said socket of said electrical receptacle; mounting means for mounting said electrical receptacle on said closure; a first flange extending outwardly from said mounting means: a second flange extending inwardly from said housing; conduit means for conducting electrical energy from a remote power source to said electrical receptacle; and sealing means interposed between said housing and said closure.

2. An apparatus as recited in claim 1, said closure including latch means for selectively maintaining said closure in said recessed position.

3. An apparatus as recited in claim 1, each said splash guard being pivotally mounted relative to each respective said socket, each said splash guard being articulated from a closed position, contacting its respective said socket, to an open position.

4. An apparatus as recited in claim 1, said housing having a back which is open-ended, there further being a back plate detachably mounted over said open-ended back.

5. An apparatus as recited in claim 4, said back plate being sealingly mounted on said housing with a plurality of fasteners.

6. An apparatus as recited in claim 1, said housing including a border face plate.

7. An apparatus as recited in claim 6, said face plate having a plurality of throughbores formed therein for receiving mounting fasteners.

8. An apparatus as recited in claim 7, further including sealing means peripherally disposed on said face plate.

9. An apparatus as recited in claim 1, said sealing means interposed between said housing and said closure including a seal peripherally disposed about a peripheral edge of said housing.

10. An apparatus as recited in claim 1, said mounting means for mounting said electrical receptacle on said closure including a longitudinal wall having at least one aperture in registration with each said socket of said receptacle, said longitudinal wall extending from said inner surface of said closure.

11. An apparatus as recited in claim 10, including a pair of transverse walls wedged between said longitudinal wall and said closure, thus to define an open volume.

12. An apparatus as recited in claim 11, wherein
said first flange peripherally extending outwardly from said longitudinal wall and said transverse walls; and.

13. An apparatus as recited in claim 12, said sealing means interposed between said housing and said closure including a seal interposed between said first flange and said second flange.

14. A recessible electrical receptacle apparatus comprising:

a housing;

a closure having an inner surface and an outer surface;

hinge means for pivotally mounting said closure on said housing, said closure being pivotable from a closed, recessed position to an open, service position;

an electrical receptacle including at least one socket;

mounting means for mounting said electrical receptacle on said closure, said mounting means including a longitudinal wall having at least one aperture in registration with each said socket of said receptacle, said longitudinal wall extending from said inner surface of said closure;

a pair of transverse walls wedged between said longitudinal wall and said closure, to define an open volume;

conduit means for conducting electrical energy from a remote power source to said electrical receptacle;

sealing means interposed between said housing and said closure;

a first flange peripherally extending outwardly from said longitudinal wall and said transverse walls; and, a second flange extending inwardly from said housing.

15. An apparatus as recited in claim 14, said sealing means interposed between said housing and said closure including a seal interposed between said first flange and said second flange.

* * * * *